(12) United States Patent
Paladugu et al.

(10) Patent No.: US 11,632,665 B2
(45) Date of Patent: Apr. 18, 2023

(54) PROXIMITY SERVICES SESSION AUTHORIZATION AND PROVISIONING SUPPORT OVER A 5G SYSTEM

(71) Applicant: QUALCOMM Incorporated, San Diego, CA (US)

(72) Inventors: Karthika Paladugu, San Diego, CA (US); Gavin Bernard Horn, La Jolla, CA (US); Hong Cheng, Basking Ridge, NJ (US); Miguel Griot, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 278 days.

(21) Appl. No.: 16/948,671

(22) Filed: Sep. 28, 2020

(65) Prior Publication Data

US 2021/0136555 A1 May 6, 2021

Related U.S. Application Data

(60) Provisional application No. 62/931,628, filed on Nov. 6, 2019.

(51) Int. Cl.
*H04W 4/00* (2018.01)
*H04W 8/00* (2009.01)
(Continued)

(52) U.S. Cl.
CPC ........... *H04W 8/005* (2013.01); *H04W 12/06* (2013.01); *H04W 48/18* (2013.01); *H04W 76/14* (2018.02); *H04W 76/25* (2018.02)

(58) Field of Classification Search
CPC ..... H04W 8/005; H04W 76/14; H04W 12/06; H04W 76/25; H04W 48/18; H04W 8/00
(Continued)

(56) References Cited

U.S. PATENT DOCUMENTS

2013/0288668 A1* 10/2013 Pragada ................ H04M 15/00
455/426.1
2014/0162688 A1* 6/2014 Edge ....................... H04W 4/06
455/456.1

(Continued)

FOREIGN PATENT DOCUMENTS

WO 2019196847 A1 10/2019

OTHER PUBLICATIONS

International Search Report and Written Opinion—PCT/US2020/070588—ISA/EPO—dated Dec. 15, 2020.

*Primary Examiner* — Marceau Milord
(74) *Attorney, Agent, or Firm* — Harrity & Harrity, LLP

(57) ABSTRACT

Various aspects of the present disclosure generally relate to wireless communication. In some aspects, a user equipment may provide a session request associated with establishing a proximity services (ProSe) session. The session request may include ProSe session specific information including information that indicates a ProSe service type associated with the ProSe session. The user equipment may receive a session establishment response after providing the session request. The session establishment response may include at least one of a ProSe session authorization indication associated with the UE, or ProSe policy information for the ProSe service type associated with the ProSe session. Numerous other aspects are provided.

30 Claims, 12 Drawing Sheets

(51) Int. Cl.
  *H04W 76/14* (2018.01)
  *H04W 12/06* (2021.01)
  *H04W 76/25* (2018.01)
  *H04W 48/18* (2009.01)

(58) Field of Classification Search
  USPC .......................................................... 370/329
  See application file for complete search history.

(56) References Cited

U.S. PATENT DOCUMENTS

| | | | |
|---|---|---|---|
| 2014/0243038 A1* | 8/2014 | Schmidt | H04W 76/14 |
| | | | 455/552.1 |
| 2014/0256365 A1* | 9/2014 | Schmidt | H04W 76/14 |
| | | | 455/466 |
| 2014/0335906 A1* | 11/2014 | Kim | H04W 4/80 |
| | | | 455/509 |
| 2016/0286354 A1 | 9/2016 | Kim et al. | |
| 2016/0381720 A1* | 12/2016 | Baek | H04W 8/14 |
| | | | 370/329 |
| 2017/0303322 A1 | 10/2017 | Watfa et al. | |
| 2017/0374611 A1* | 12/2017 | Pragada | H04L 69/24 |
| 2018/0115937 A1* | 4/2018 | Poitau | H04W 40/246 |
| 2018/0317268 A1* | 11/2018 | Kim | H04W 8/005 |
| 2020/0187108 A1* | 6/2020 | Pragada | H04W 8/005 |
| 2021/0136570 A1* | 5/2021 | Paladugu | H04W 4/70 |
| 2022/0007161 A1* | 1/2022 | Shan | H04W 60/04 |

\* cited by examiner

PROXIMITY SERVICES SESSION AUTHORIZATION AND PROVISIONING SUPPORT OVER A 5G SYSTEM

CROSS-REFERENCE TO RELATED APPLICATION

This patent application claims priority to U.S. Provisional Patent Application No. 62/931,628, filed on Nov. 6, 2019, entitled "PROXIMITY SERVICES SESSION AUTHORIZATION AND PROVISIONING SUPPORT OVER A 5G SYSTEM," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for proximity services (ProSe) session authorization and provisioning support over a 5G system (5GS).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipments (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include providing a session request associated with establishing a proximity services (ProSe) session, wherein the session request includes ProSe session specific information including information that indicates a ProSe service type associated with the ProSe session; and receiving a session establishment response after providing the session request, wherein the session establishment response includes at least one of: a ProSe session authorization indication associated with the UE, or ProSe policy information for the ProSe service type associated with the ProSe session.

In some aspects, a method of wireless communication, performed by a network device, may include receiving a session request associated with establishing a ProSe session for a UE, wherein the session request includes ProSe session specific information including information that indicates a ProSe service type associated with the ProSe session; determining, based at least in part on the ProSe session specific information, a session establishment response, wherein the session establishment response includes at least one of: a ProSe session authorization indication associated with the UE, or ProSe policy information associated with the ProSe session; and providing the session establishment response.

In some aspects, a method of wireless communication, performed by an access and mobility management function device, may include receiving a session request associated with establishing a ProSe session for a UE, wherein the session request includes ProSe session specific information including information that indicates a ProSe service type associated with the ProSe session; selecting, based at least in part on the ProSe session specific information, a session management device for managing the ProSe session; and providing the session request to the session management device.

In some aspects, a network device for wireless communication may include memory and one or more processors operatively coupled to the memory. The memory and the one or more processors may be configured to provide a session request associated with establishing a ProSe session, wherein the session request includes ProSe session specific information including information that indicates a ProSe service type associated with the ProSe session; and receive a session establishment response after providing the session request, wherein the session establishment response includes at least one of: a ProSe session authorization indication associated with the UE, or ProSe policy information for the ProSe service type associated with the ProSe session.

In some aspects, a network device for wireless communication may include memory and one or more processors operatively coupled to the memory. The memory and the one or more processors may be configured to receive a session request associated with establishing a ProSe session for a UE, wherein the session request includes ProSe session specific information including information that indicates a ProSe service type associated with the ProSe session; determine, based at least in part on the ProSe session specific information, a session establishment response, wherein the session establishment response includes at least one of: a ProSe session authorization indication associated with the UE, or ProSe policy information associated with the ProSe session; and provide the session establishment response.

In some aspects, a network device for wireless communication may include memory and one or more processors operatively coupled to the memory. The memory and the one or more processors may be configured to receive a session request associated with establishing a ProSe session for a UE, wherein the session request includes ProSe session specific information including information that indicates a ProSe service type associated with the ProSe session; select, based at least in part on the ProSe session specific information, a session management device for managing the ProSe session; and provide the session request to the session management device.

In some aspects, a non-transitory computer-readable medium may store one or more instructions for wireless communication. The one or more instructions, when executed by one or more processors of a network device, may cause the one or more processors to: provide a session request associated with establishing a ProSe session, wherein the session request includes ProSe session specific information including information that indicates a ProSe service type associated with the ProSe session; and receive a session establishment response after providing the session request, wherein the session establishment response includes at least one of: a ProSe session authorization indication associated with the UE, or ProSe policy information for the ProSe service type associated with the ProSe session.

In some aspects, a non-transitory computer-readable medium may store one or more instructions for wireless communication. The one or more instructions, when executed by one or more processors of a network device, may cause the one or more processors to: receive a session request associated with establishing a ProSe session for a UE, wherein the session request includes ProSe session specific information including information that indicates a ProSe service type associated with the ProSe session; determine, based at least in part on the ProSe session specific information, a session establishment response, wherein the session establishment response includes at least one of: a ProSe session authorization indication associated with the UE, or ProSe policy information associated with the ProSe session; and provide the session establishment response.

In some aspects, a non-transitory computer-readable medium may store one or more instructions for wireless communication. The one or more instructions, when executed by one or more processors of a network device, may cause the one or more processors to: receive a session request associated with establishing a ProSe session for a UE, wherein the session request includes ProSe session specific information including information that indicates a ProSe service type associated with the ProSe session; select, based at least in part on the ProSe session specific information, a session management device for managing the ProSe session; and provide the session request to the session management device.

In some aspects, an apparatus for wireless communication may include means for providing a session request associated with establishing a ProSe session, wherein the session request includes ProSe session specific information including information that indicates a ProSe service type associated with the ProSe session; and means for receiving a session establishment response after providing the session request, wherein the session establishment response includes at least one of: a ProSe session authorization indication associated with the apparatus, or ProSe policy information for the ProSe service type associated with the ProSe session.

In some aspects, an apparatus for wireless communication may include means for receiving a session request associated with establishing a ProSe session for a UE, wherein the session request includes ProSe session specific information including information that indicates a ProSe service type associated with the ProSe session; means for determining, based at least in part on the ProSe session specific information, a session establishment response, wherein the session establishment response includes at least one of: a ProSe session authorization indication associated with the UE, or ProSe policy information associated with the ProSe session; and means for providing the session establishment response.

In some aspects, an apparatus for wireless communication may include means for receiving a session request associated with establishing a ProSe session for a UE, wherein the session request includes ProSe session specific information including information that indicates a ProSe service type associated with the ProSe session; means for selecting, based at least in part on the ProSe session specific information, a session management device for managing the ProSe session; and means for providing the session request to the session management device.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
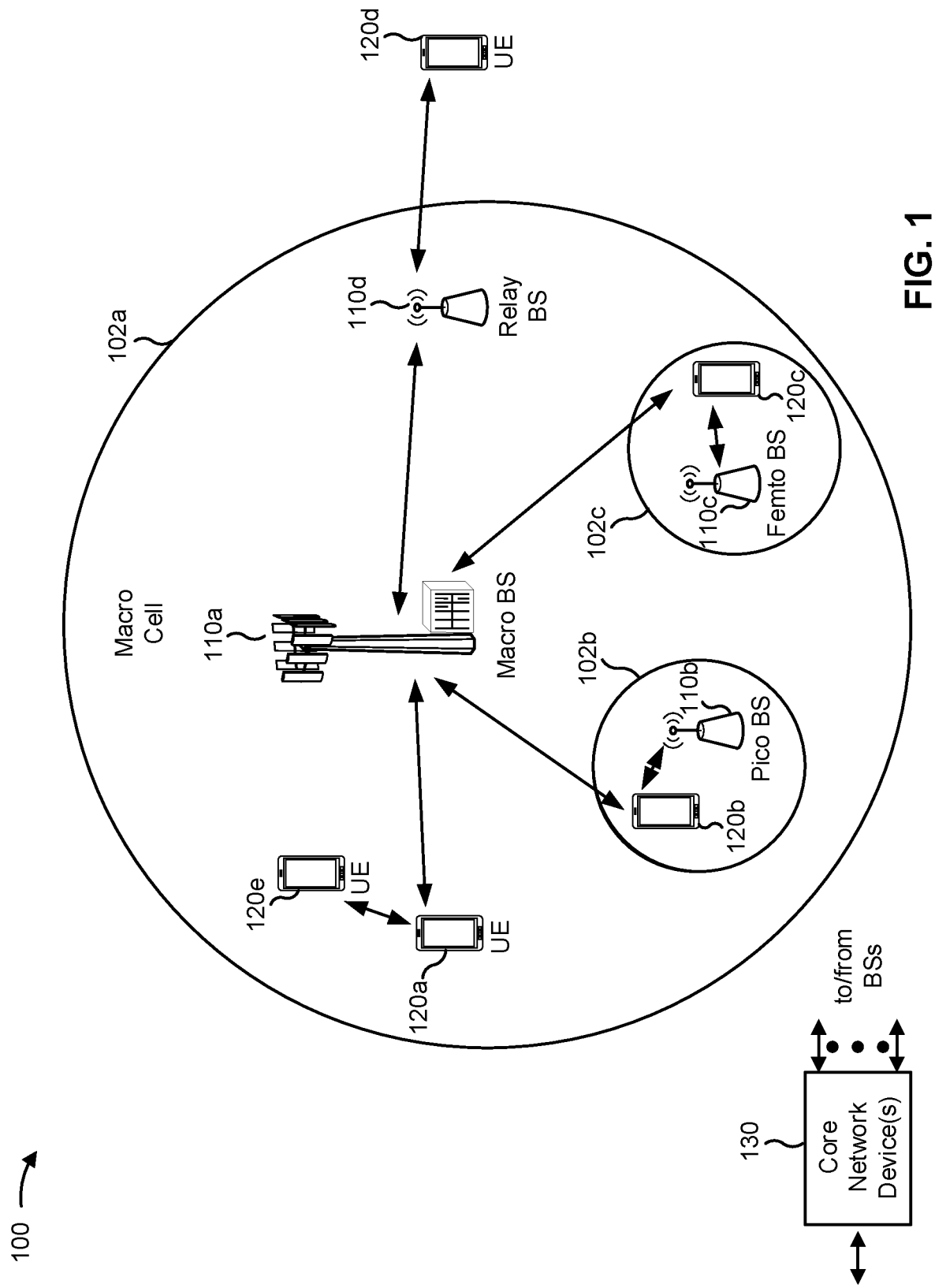
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

Network device 130 may include one or more devices configured to provide one or more 5G network functions. For example, in some aspects, network device 130 may be a device configured with a unified data management (UDM) function, a policy control function (PCF), a network exposure function (NEF), an application function (AF), a unified data repository (UDR), an access and mobility management function (AMF), a session management function (SMF), a ProSe management function (PSMF), a user plane function (UPF), a network slice selection function (NSSF), an authentication server function (AUSF), and/or another type of network function. Example components of network device 130 are described below with respect to FIG. 3, and example architectures comprising network functions associated with one or more network devices 130 are described in below with respect to FIGS. 4A, 4B, 5A, and 5B. In some aspects, network device 130 may be a device included in a 5G core network (5GC) of a 5GS.

In some aspects, network device 130 may include a network controller that couples to a set of BSs in association with providing, for example, coordination and control for BSs 110. In some aspects, network device 130 may communicate with BSs 110 via a backhaul. In some aspects, BSs 110 may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband Internet-of-things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more ProSe channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
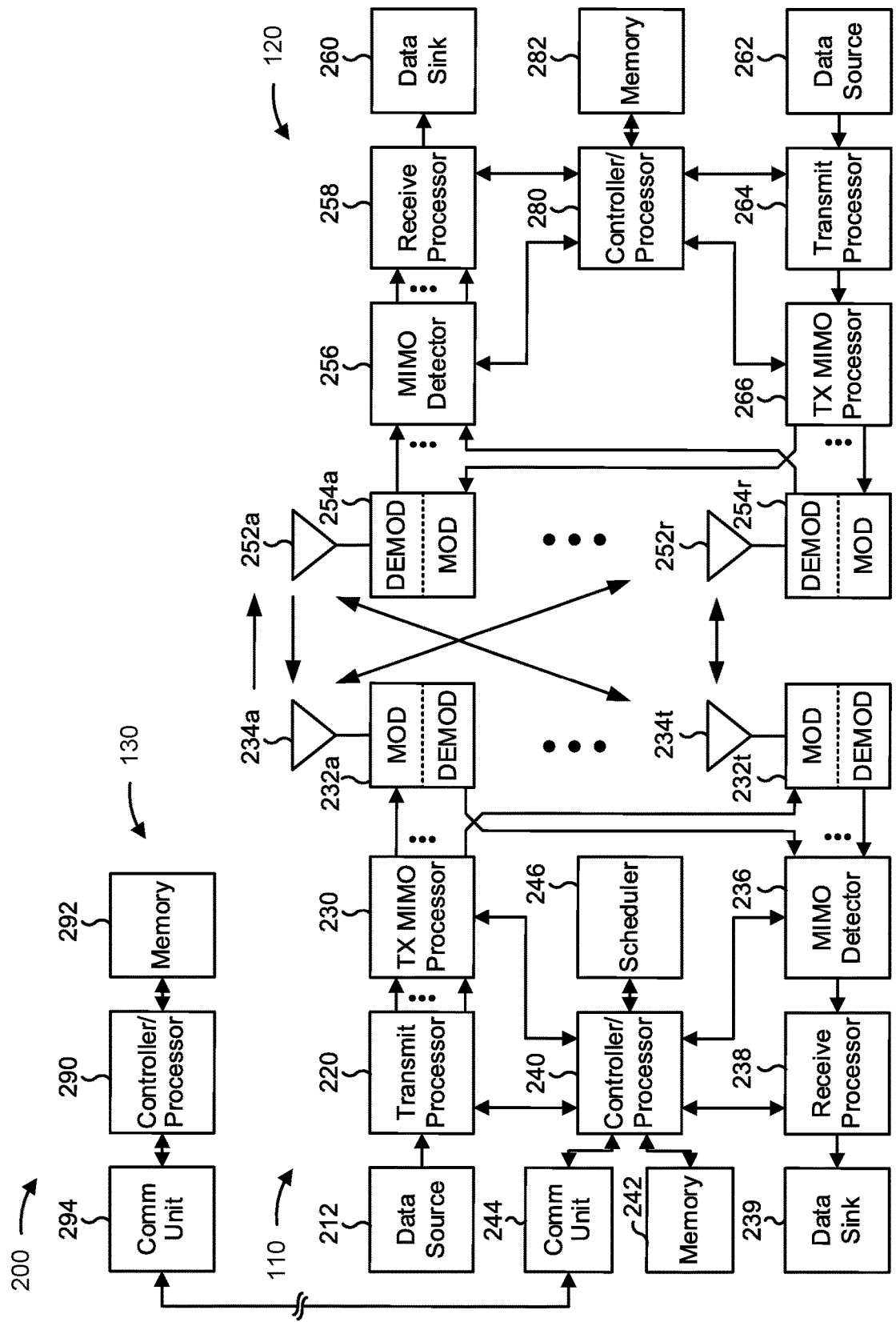
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network device 130 via communication unit 244.

Controller/processor 240 of base station 110, controller/processor 280 of UE 120, and/or any other component(s) of FIG. 2 may perform one or more techniques associated with proximity services (ProSe) session authorization and provisioning support over a 5G system (5GS), as described in more detail elsewhere herein. For example, controller/processor 280 of UE 120, and/or any other component(s) of FIG. 2 may perform or direct operations of, for example, process 700 of FIG. 7 and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the UE 120, may perform or direct operations of, for example, process 700 of FIG. 7 and/or other processes as described herein. A scheduler 246 may schedule UEs for data transmission on the downlink and/or uplink.

In some aspects, UE 120 may include means for providing a session request associated with establishing a ProSe session, wherein the session request includes ProSe session specific information including information that indicates a ProSe service type associated with the ProSe session; means for receiving a session establishment response after providing the session request, wherein the session establishment response includes at least one of a ProSe session authorization indication associated with UE 120, or ProSe policy information for the ProSe service type associated with the ProSe session; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

Figure 3:
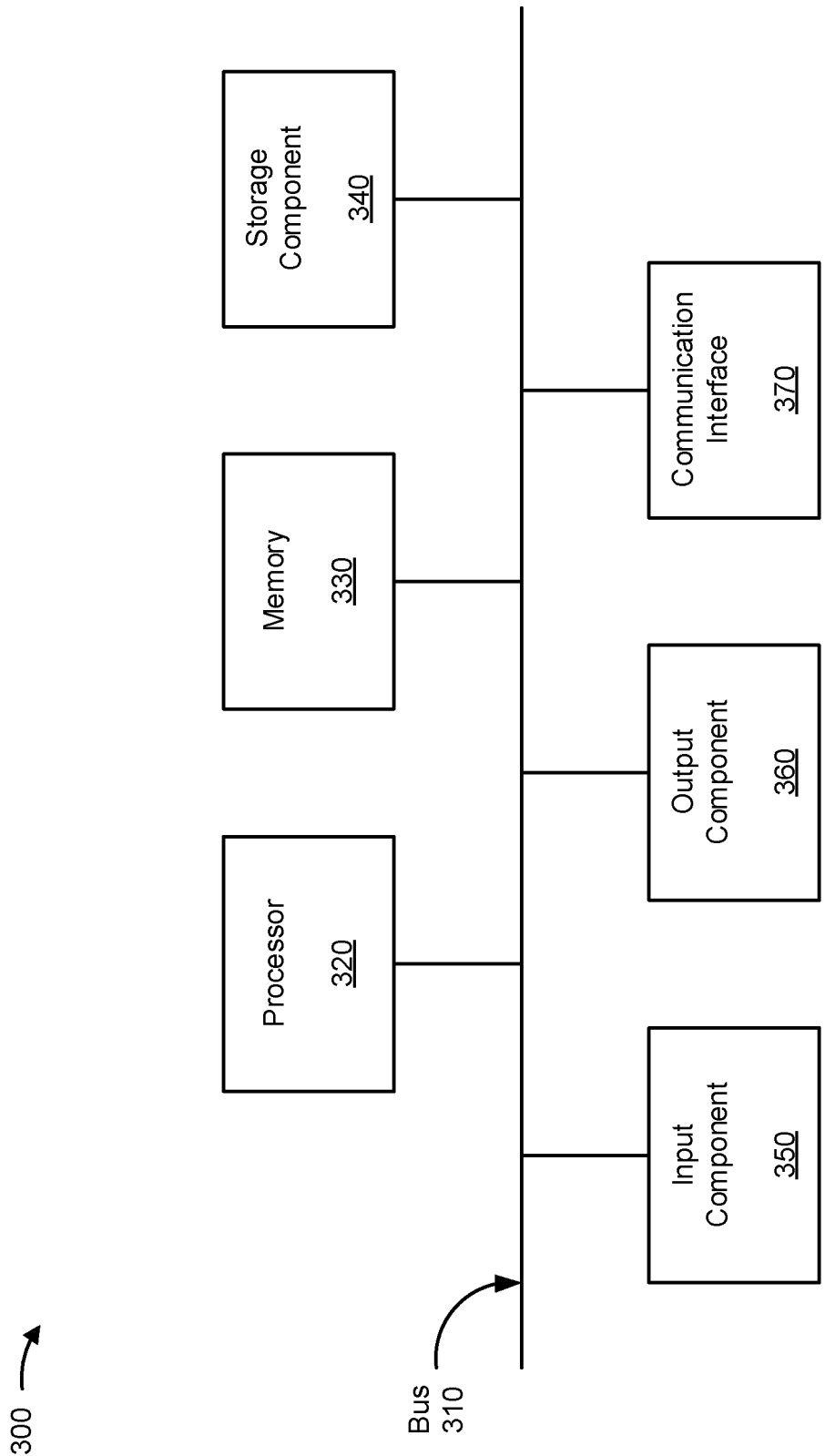
FIG. 3 is a block diagram conceptually illustrating an example of a network device in a wireless communication network, in accordance with various aspects of the present disclosure.

FIG. 3 is a diagram of example components of a device 300. Device 300 may correspond to network device 130. In some aspects, network device 130 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some aspects, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based at least in part on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, aspects described herein are not limited to any specific combination of hardware circuitry and software.

Processor 320 of network device 130, and/or any other component(s) of FIG. 3 may perform one or more techniques associated with proximity services (ProSe) session authorization and provisioning support over a 5G system (5GS), as described in more detail elsewhere herein. For example, processor 320 of network device 130, and/or any other component(s) of FIG. 3 may perform or direct operations of, for example, process 900 of FIG. 9, process 1000 of FIG. 10, and/or other processes as described herein. Memory 330 may store data and program codes for network device 130. In some aspects, memory 330 may comprise a non-transitory computer-readable medium storing one or more instructions for wireless communication. For example, the one or more instructions, when executed by one or more processors of network device 130, may perform or direct operations of, for example, process 900 of FIG. 9, process 1000 of FIG. 10, and/or other processes as described herein.

In some aspects, network device 130 may include means for receiving a session request associated with establishing a ProSe session for a UE 120, wherein the session request includes ProSe session specific information including information that indicates a ProSe service type associated with the ProSe session; means for determining, based at least in part on the ProSe session specific information, a session establishment response, wherein the session establishment response includes at least one of a ProSe session authorization indication associated with UE 120, or ProSe policy information associated with the ProSe session; means for providing the session establishment response; and/or the like. In some aspects, such means may include one or more components of network device 130 described in connection with FIG. 3, such as bus 310, processor 320, memory 330, storage component 340, input component 350, output component 360, communication interface 370, and/or the like.

In some aspects, network device 130 may include means for receiving a session request associated with establishing a ProSe session for UE 120, wherein the session request includes ProSe session specific information including information that indicates a ProSe service type associated with the ProSe session; means for selecting, based at least in part on the ProSe session specific information, a session management device for managing the ProSe session; means for providing the session request to the session management device; and/or the like. In some aspects, such means may include one or more components of network device 130 described in connection with FIG. 3, such as bus 310, processor 320, memory 330, storage component 340, input component 350, output component 360, communication interface 370, and/or the like.

As indicated above, FIG. 3 is provided as an example. Other examples may differ from what is described with regard to FIG. 3.

A 5G system (5GS) architecture may support a vehicle-to-anything (V2X) service over PC5 interface (e.g., a direct communication link between a vehicle and another device). It may be desirable to allow PC5 in a 5GS to support types of proximity services (ProSe) (also referred to as device-to-device (D2D) services, sidelink (SL) services, PC5 services, and/or the like) in addition to V2X. Such other services may be used for applications including, for example, public safety, a commercial service (e.g., gaming, an interactive service, and/or the like), an industrial Internet-of-Things (IIoT) application, wearable device communication, and/or the like. However, operational and/or service requirements for such applications may differ from V2X, as well among each other. These different applications can be thought of as different ProSe session cases where, for a given ProSe service, an authorization and a policy are needed in order to use the given ProSe service on a PC5 connection. Notably, such use cases require in-coverage operation, meaning that a UE needs to be connected to a base station (e.g., via Uu connection) in order to obtain the ProSe service, and session authorization and provisioning information to support ProSe operation.

Some aspects described herein provide techniques and apparatuses for ProSe session authorization and provisioning support over a 5GS. Aspects described herein provide 5GS architectural changes to support, and the procedural changes required to support, ProSe session (e.g., discovery, communication, and/or the like) authorization and provisioning for in-coverage operation. As described below, during these processes, the 5G core network (5GC) may in some cases provision parameters for out-of-coverage operation and partial coverage operations.

Notably, Uu registration (i.e., UE registration via the Uu interface) procedures provide a high-level authorization on whether a ProSe service is allowed for a UE. However, ProSe operation is needed for different use cases and should be supported for multiple coverage scenarios, communication types, discovery models and roles that are possible. Therefore, additional session management, authorization and configuration provisioning procedures are necessary.

FIGS. 4A, 4B, 5A, and 5B are diagrams illustrating example architectures associated with ProSe session authorization and provisioning support over a 5GS, in accordance with various aspects of the present disclosure.

Figure 4A:
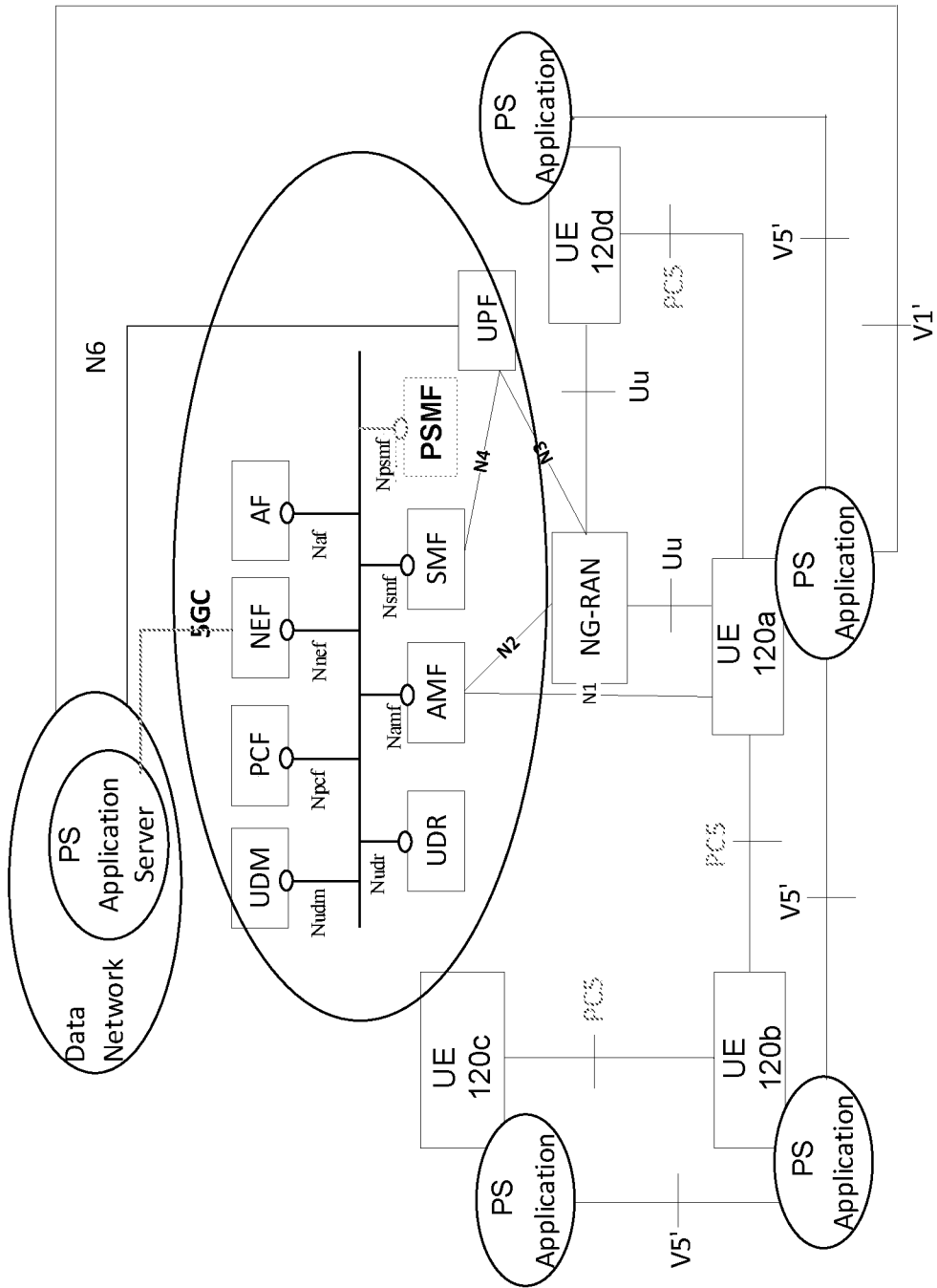
FIGS. 4A, 4B, 5A, and 5B are diagrams illustrating example architectures associated with ProSe session authorization and provisioning support over a 5GS, in accordance with various aspects of the present disclosure.
Figure 4B:
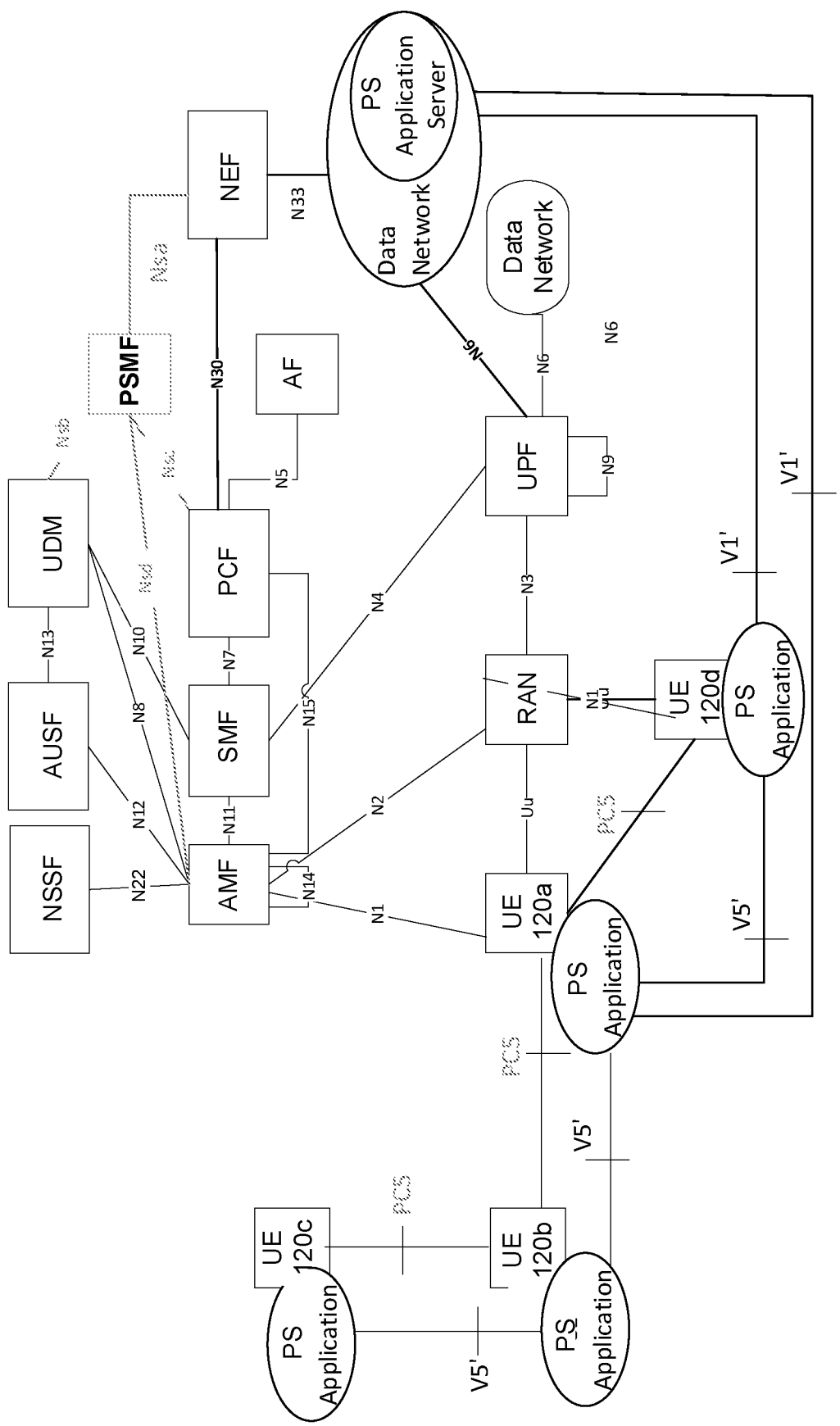

FIGS. 4A and 4B are diagrams associated with a first example 5GS architecture that supports ProSe session authorization and provisioning support over 5GS. FIG. 4A is a diagram illustrating an example 400 of the first example 5GS architecture with service-based interfaces, while FIG. 4B is a diagram illustrating an example 450 of the first example architecture in reference point representation.

Figure 5A:
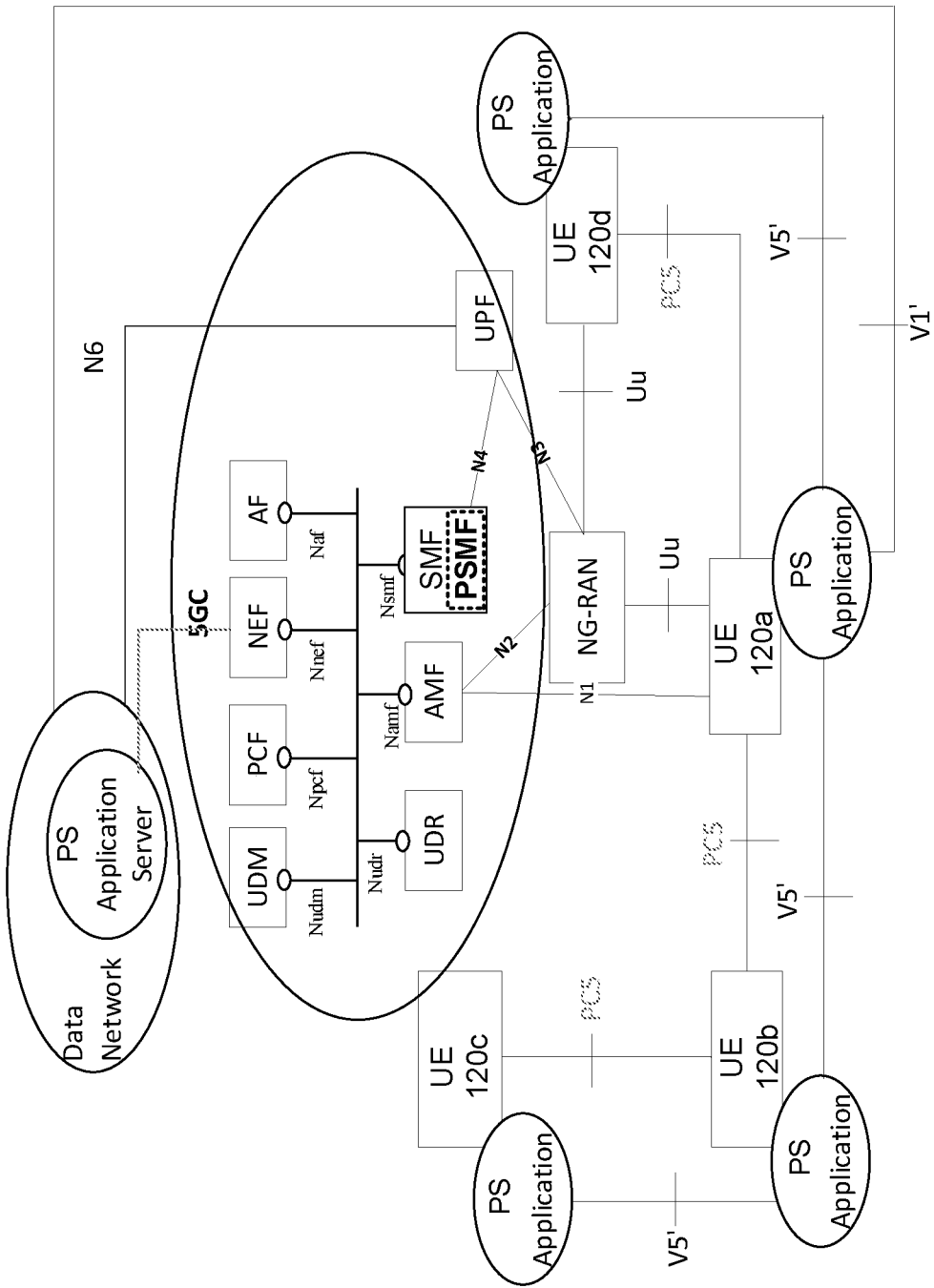
Figure 5B:
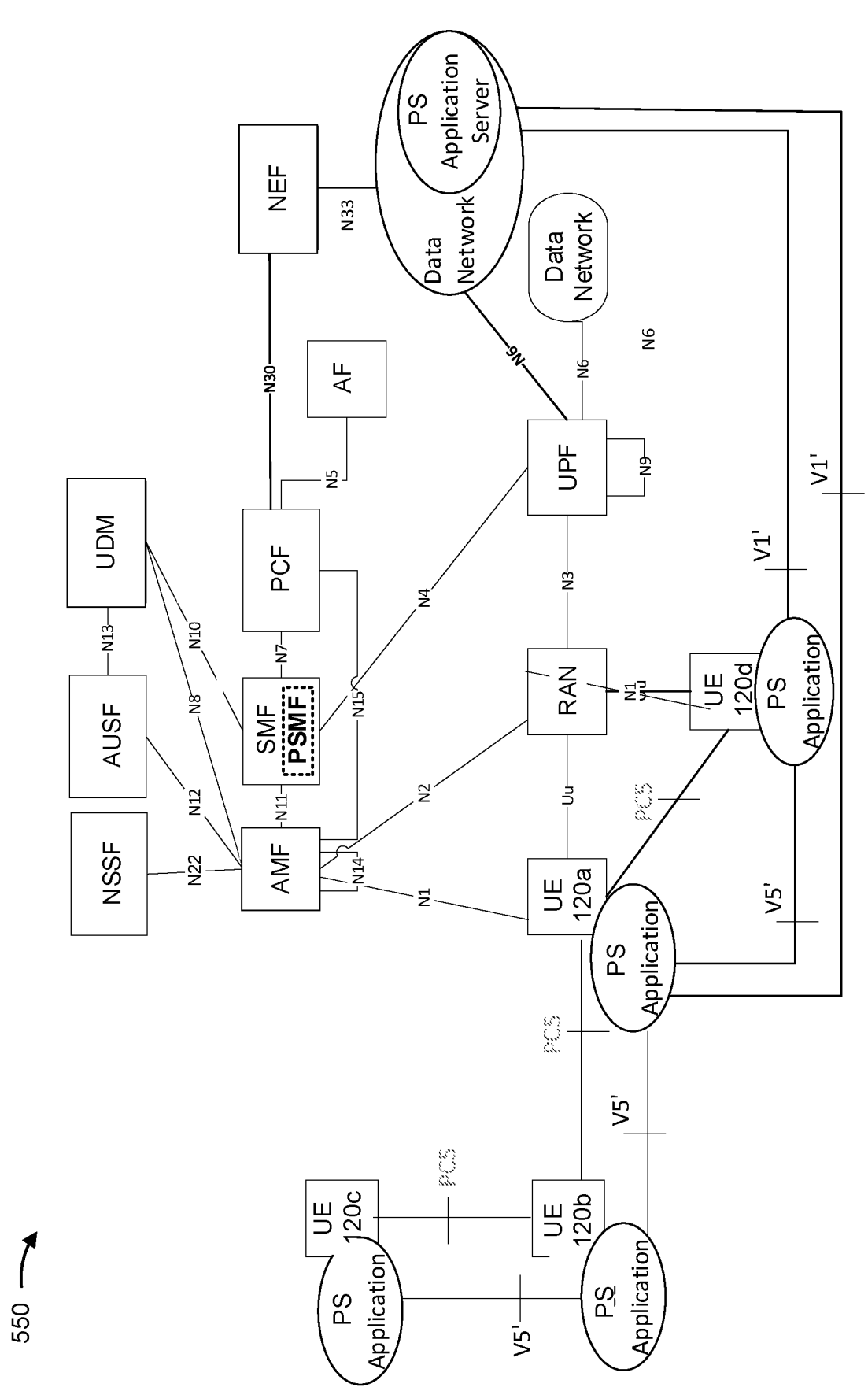

FIGS. 5A and 5B are diagrams associated with a second example 5GS architecture that supports ProSe session authorization and provisioning support over 5GS. FIG. 5A is a diagram illustrating an example 500 of the second example 5GS architecture with service-based interfaces, while FIG. 5B is a diagram illustrating an example 550 of the second example architecture in reference point representation.

As shown in FIGS. 4A, 4B, 5A, and 5B, as in a conventional 5GC, the 5GC in the first and second example architectures may include a unified data management function (UDM), a policy control function (PCF), a network exposure function (NEF), an application function (AF), a unified data repository (UDR), an access and mobility management function (AMF), a session management function (SMF), a user plane function (UPF), a network slice selection function (NSSF), and an authentication server function (AUSF). In some aspects, one or more of these network functions may be configured on one or more network devices 130. In some aspects, one or more of these network functions of the 5GC, such as the AMF, the PCF, the UDM, and/or the like, may perform one or more operations associated with ProSe session authorization and provisioning support over the 5GS, as described below with regard to FIGS. 6 and 7. As a particular example, in some aspects, the PCF may support provisioning and/or authorization of a UE 120 and/or the AMF for ProSe subscription.

As further shown in FIGS. 4A, 4B, 5A, and 5B, the 5GC may further include a ProSe management function (PSMF). In some aspects, as shown in FIGS. 4A and 4B, the PSMF may be separate from other network functions of the 5GC. That is, in some aspects, the PSMF may be a standalone function in the 5GC (rather than being integrated with another function as in the second example architecture shown in FIGS. 5A and 5B). Alternatively, as shown in FIGS. 5A and 5B, the PSMF may be integrated with another network function of the 5GC, such as the SMF. That is, in some aspects, the SMF may be enhanced, update, modified, and/or the like, with the PSMF (rather than the PSMF being a standalone function in the 5GC as in the first example architecture shown in FIGS. 4A and 4B).

In some aspects, the PSMF may perform one or more operations associated with ProSe session authorization and provisioning support over the 5GS, as described in further detail below with regard to FIGS. 6 and 7. In some aspects, the PSMF may have multiple logical functions to support functionality for ProSe. For example, in some aspects, the PSMF may support ProSe discovery/communication specific policy provisioning/authorization, ProSe session authorization and discovery/communication policy provisioning, ProSe discovery signaling authorization and parameter provisioning, and/or the like, as described below. In some aspects, the PSMF may be configured on one or more network devices 130 included in the 5GC.

In some aspects, as illustrated in FIGS. 4A, 4B, 5A, and 5B, communication associated with a ProSe service for a given pair of UEs 120 (e.g., direct communication link between the given pair of UEs 120) may be over a PC5 interface. That is, PC5 may act as an interface between UEs 120 for ProSe operation, in some aspects. In some aspects, ProSe control signaling associated with a UE 120 may be carried in a non-access stratum (NAS) transport container (e.g., over a Uu connection), as described below.

In some aspects, as illustrated in FIGS. 4A, 4B, 5A, and 5B, a ProSe application server (e.g., an application server associated with the ProSe service) may provision one or more of the network functions (e.g., the PSMF, the PCF, and/or the like) with ProSe service information (e.g., via the NEF). That is, in some aspects, the ProSe application server may support ProSe service parameter provisioning.

Examples of ProSe session authorization and provisioning support over a 5GS using architectures such as those shown in FIGS. 4A, 4B, 5A, and 5B are described below.

As indicated above, FIGS. 4A, 4B, 5A, and 5B are provided as examples. Other examples may differ from what is described with respect to FIGS. 4A, 4B, 5A, and 5B.

Figure 6:
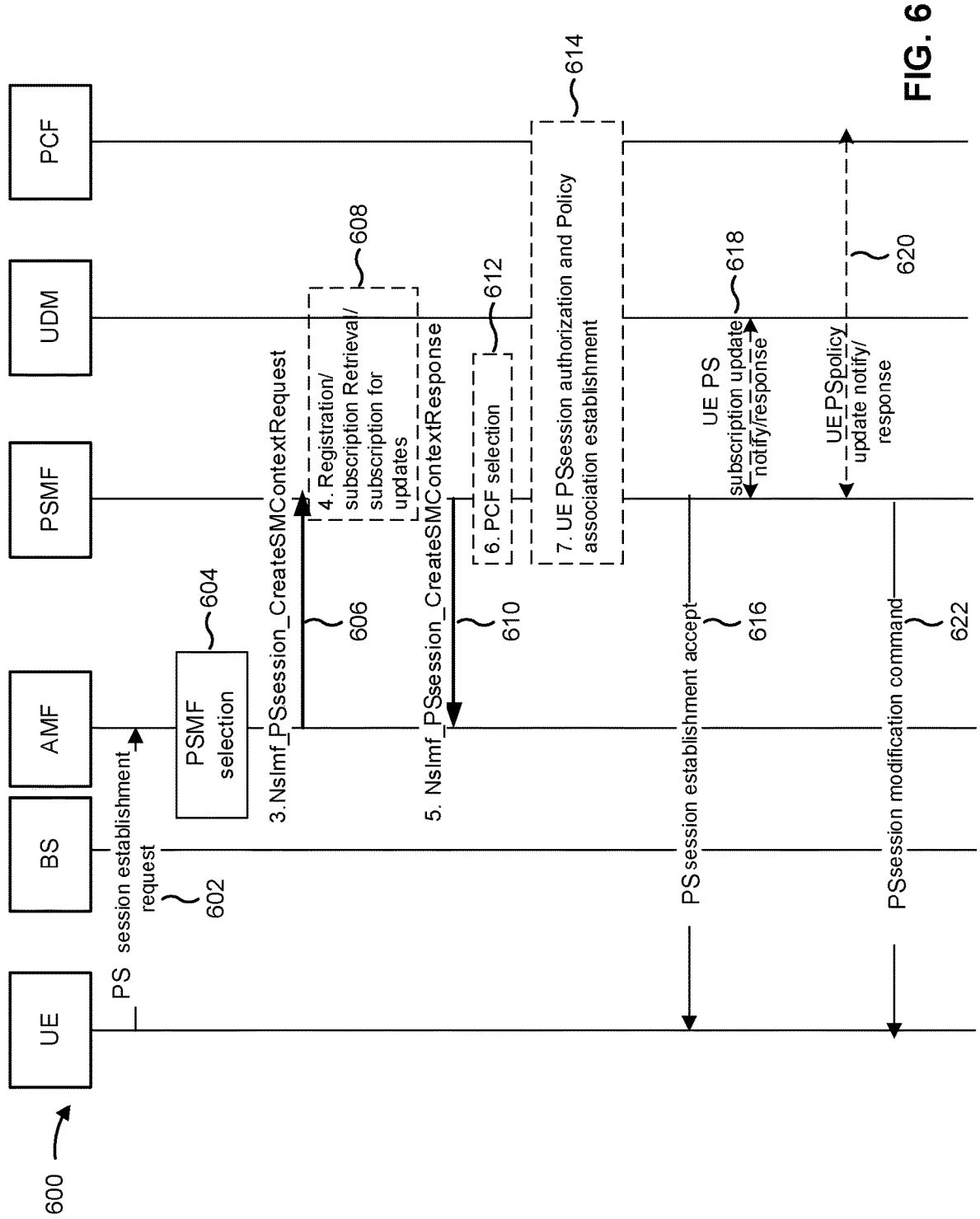
FIGS. 6 and 7 are diagrams illustrating example call flows associated with ProSe session authorization and provisioning support over a 5GS, in accordance with various aspects of the present disclosure.
Figure 7:
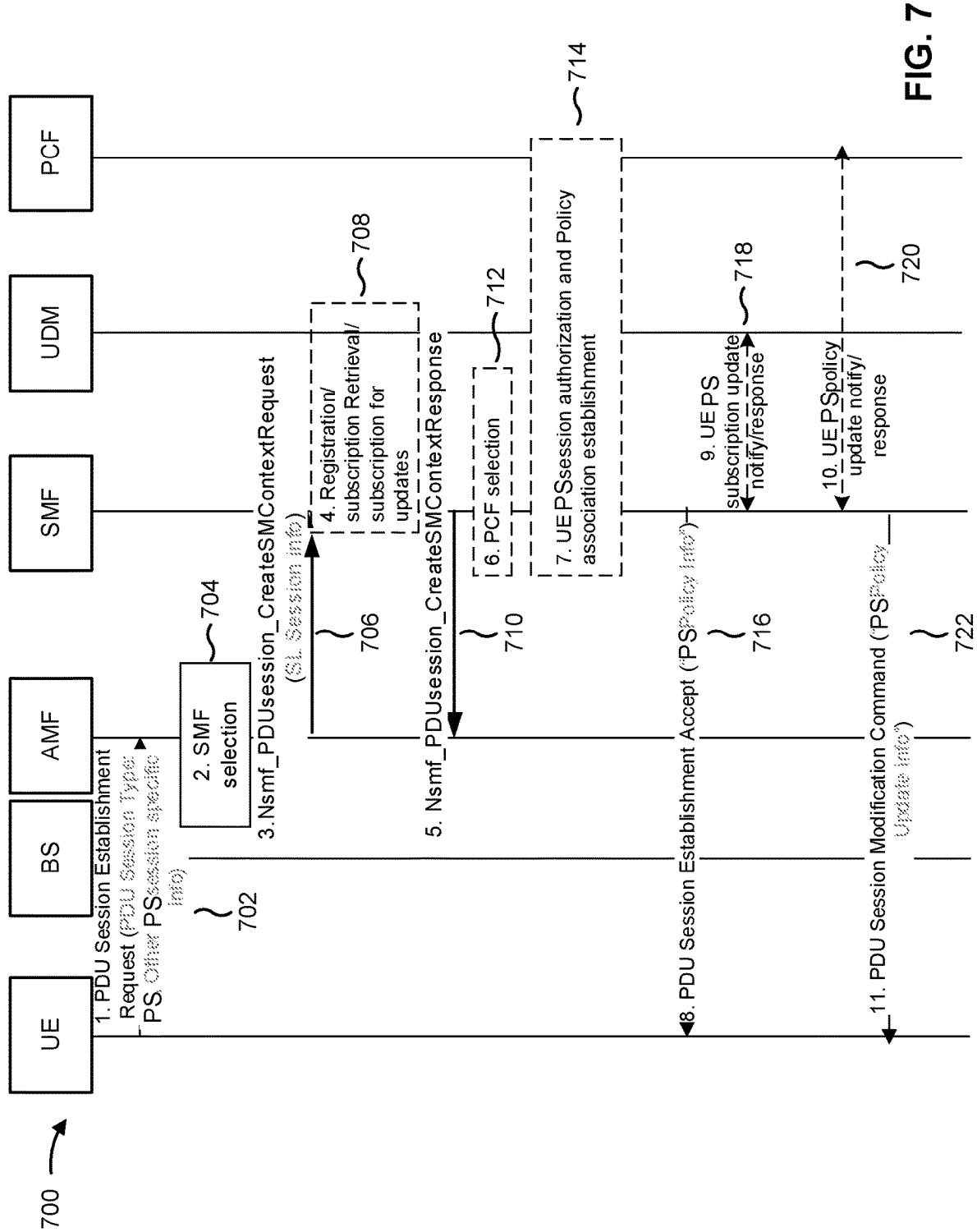

FIGS. 6 and 7 are diagrams illustrating example call flows 600 and 700, respectively, associated with ProSe session authorization and provisioning support over a 5GS, in accordance with various aspects of the present disclosure. In FIGS. 6 and 7, a UE (e.g., UE 120) is in-coverage, and has registered with a base station (e.g., base station 110) via, for example, a Uu interface. In these examples, the UE is attempting to establish a ProSe session in association with receiving a ProSe service.

In the example call flow 600 shown in FIG. 6, the PSMF function is a standalone function in the 5GC, as illustrated in the example architecture shown in FIGS. 4A and 4B. In some aspects, the PSMF may be configured on one or more network devices 130 in the 5GC of the 5GS.

As shown by reference 602, the UE provides a session request associated with establishing the ProSe session. For example, upon determining that a ProSe session is needed for a particular ProSe service, the UE may provide a session request associated with establishing the ProSe session. As shown, in some aspects, the UE may provide the session request to a network device (e.g., network device 130) configured with the AMF (herein referred to as the AMF). As shown, in some aspects, the UE may provide the session request (e.g., via a base station 110) to an access and mobility management device in the 5GC (e.g., a network device 130 configured with the AMF).

In some aspects, the session request may include ProSe session specific information, such as information that indicates a ProSe service type associated with the ProSe session. That is, the session request may include information that identifies a type of ProSe service for which the ProSe session is to be used by the UE. In some aspects, the ProSe service type of the ProSe service may be, for example, a public safety service type, a commercial service type (e.g., a gaming service type, an interactive service type, and/or the like), an IIOT service type, a wearable device service type, or another type of proximity-based service for D2D communication.

In some aspects, the ProSe session specific information may include, for example, ProSe network slice selection assistance information (PS-NSSAI). In some aspects, the PS-NSSAI may identify a network slice associated with the particular ProSe service for which the UE has requested the ProSe session. In some aspects, the ProSe session specific information may include another type of information (e.g., a destination device address, information associated with QoS flow, and/or the like) associated with the ProSe service for which the UE needs the ProSe session.

In some aspects, when the PSMF is a standalone function in the 5GC, the session request may be a ProSe session establishment request, as shown in FIG. 6. In some aspects, the ProSe session establishment request may be provided in a non-access stratum (NAS) transport container for ProSe.

As shown by reference 604, the access and mobility management device may receive the session request including the ProSe session specific information that indicates the ProSe service type associated with the ProSe session, and may select, based at least in part on the ProSe session specific information, a session management device for managing the ProSe session. In the example shown in FIG. 6, since the PSMF is a standalone function in the 5GC, the session management device selected by the access and mobility management device may be a network device (e.g., a network device 130) configured with the PSMF.

In some aspects, the access and mobility management device may perform PSMF selection based at least in part on, for example, the PS-NSSAI and/or ProSe session specific information included in the session request. In some aspects, as shown by references 606 and 610, the access and mobility management device and the selected session management device may create a ProSe session context at the session management. As further shown, the access and mobility management device may provide the session request (e.g., in a container) to the selected session management after creating the ProSe session context.

As shown, the session management device (e.g., the PSMF in example call flow 600) may receive, from the access and mobility management device, the session request associated with establishing the ProSe session.

In some aspects, the session management device may determine whether the UE is authorized for ProSe sessions based at least in part on subscription information associated with the UE. For example, as shown by reference 608, the session management device may obtain, from a UDM device (e.g., a network device 130 configured with the UDM function) subscription information that indicates whether the UE is authorized for ProSe sessions. Here, the PSMF may determine whether the UE is authorized for ProSe sessions based at least in part on the subscription information. In some aspects, the PSMF may register with the UDM to receive updates to the subscription information associated with the UE.

In some aspects, the session management device may determine, based at least in part on the ProSe session specific information included in the session request, a session establishment response. For example, after determining that the UE is authorized for ProSe sessions based at least in part on the subscription information, the session management device may determine a session establishment response based at least in part on the ProSe session specific information. In some aspects, the session establishment response may include a ProSe session authorization indication associated with the UE and/or ProSe policy information associated with the ProSe session.

In some aspects, the ProSe session authorization indication indicates whether the UE is authorized for the ProSe service type associated with the ProSe session.

In some aspects, the ProSe policy information may include one or more operational and/or service parameters configured for the ProSe service. For example, the ProSe policy information may include authorization policy information associated with the ProSe service type (e.g., an allowed PLMN list for in-coverage, an indication whether out-of-coverage operation is permitted, and/or the like). As another example, the ProSe policy information may include discovery policy information associated with the ProSe service type (e.g., information that identifies an allowed discovery model and a role for each PLMN, a group member discovery configuration for in-coverage operation, a group member discovery configuration for out-of-coverage operation, and/or the like). As another example, the ProSe policy information may include communication policy information associated with the ProSe service type (e.g., unicast communication policy information, broadcast communication policy information, groupcast communication policy information, relay communication policy information, and/or the like). As another example, the ProSe policy information may include out-of-coverage operation information associated with one or more types of communication operation. Such information may include, for example, radio parameters, QoS parameters, a ProSe resource block configuration, and/or the like, for out-of-coverage operation associated with a given type of communication operation. In some aspects, the ProSe policy information may include an operation configuration for in-coverage, an operation configuration for out-of-coverage, and/or a configuration for partial coverage.

In some aspects, the session management device may obtain the ProSe session authorization indication and/or the ProSe policy information from a policy control device (e.g., a network device 130 configured with the PCF). For example, as shown by reference 612, the session management device may perform PCF selection in order to identify the policy control device from which the ProSe session authorization indication or the ProSe policy information can be obtained and, as shown by reference 614, may obtain the ProSe session authorization indication or the ProSe policy information from the selected policy control device. In some aspects, the session management device may select the policy control device based at least in part on the ProSe session specific information included in the session request. For example, the session management device may select the policy control device based at least in part on the session specific information included in the session request. In some aspects, the session management device may register with the policy control device to receive updates to the ProSe session authorization indication and/or updates to the ProSe policy information associated with the UE.

In some aspects, the session establishment response may include information associated with a validity timer for the ProSe session. In such a case, a validity timer may be maintained for the ProSe session. In some aspects, upon expiration of the validity timer, the ProSe session is considered invalid and the UE needs to initiate a new ProSe session setup with the session management device.

As shown by reference 616, after determining the session establishment response, the PCF may provide the session establishment response to the UE. In some aspects, such as when the PSMF is a standalone function in the 5GC, the session establishment response may be a ProSe session establishment accept message, as shown in FIG. 6.

As further shown in FIG. 6, the UE may receive the session establishment response including the ProSe session authorization indication associated with the UE (e.g., an indication of whether the UE is authorized for the type of ProSe service associated with the ProSe session) and/or the ProSe policy information for the ProSe service type associated with the ProSe session. When authorized for the type of ProSe service, the UE may then establish the ProSe session and communicate via the ProSe session in accordance with the ProSe policy information.

In some aspects, as shown by reference 618, the session management device may receive an updated ProSe session authorization indication from the UDM device. For example, the session management device may receive the updated ProSe session authorization based at least in part on registering with the UDM device to receive updates to the subscription information associated with the UE. Here, based on such an update, the UDM device may provide the updated ProSe session authorization indication to the session management device.

In some aspects, as shown by reference 620, the session management device may receive updated ProSe policy information for the ProSe service type from the policy control device. For example, the session management device may receive the updated ProSe policy information based at least in part on registering with the policy control device to receive updates to the ProSe policy information associated with the ProSe service type. Here, based on such an update, the policy control device may provide the updated ProSe policy information to the session management device.

In some aspects, as shown by reference 622, the session management device may provide, and the UE may receive, a session modification command. In some aspects, the session modification command may include an updated ProSe session authorization indication associated with the UE (e.g., received from the UDM device) and/or updated ProSe policy information for the ProSe service type associated with the ProSe session (e.g., received from the policy control device).

In some aspects, such as when the PSMF is a standalone function in the 5GC, the session modification command may be a ProSe session modification command, as shown in FIG. 6.

In the example call flow 700 shown in FIG. 7, the PSMF function is integrated with the SMF in the 5GC, as illustrated in the example architecture shown in FIGS. 5A and 5B. In some aspects, the SMF may be configured on one or more network devices 130 in the 5GC of the 5GS.

The operations in example call flow 700 are similar to the corresponding operations described in example call flow 600 (e.g., operations associated with reference 702 are similar to operations associated with reference 602, operations associated with reference 704 are similar to operations associated with reference 604, and so on). However, as illustrated in example call flow 700, the session request is a protocol data unit (PDU) session establishment request when the PSMF is integrated with the SMF, where a PDU session type indicated by the PDU session establishment request is set to ProSe. Similarly, the session establishment response is a PDU session establishment accept message when the PSMF is integrated with the SMF. Further, the session management device is a network device (e.g., network device 130) configured with the SMF (since the PSMF is integrated with the SMF), meaning that the access and mobility management device performs SMF selection and, therefore, that the session establishment response is determined and provided by the network device configured with the SMF. Similarly, the session modification command is a PDU session modification command when the PSMF is integrated with the SMF.

As indicated above, FIGS. 6 and 7 are provided as examples. Other examples may differ from what is described with respect to FIGS. 6 and 7

Figure 8:
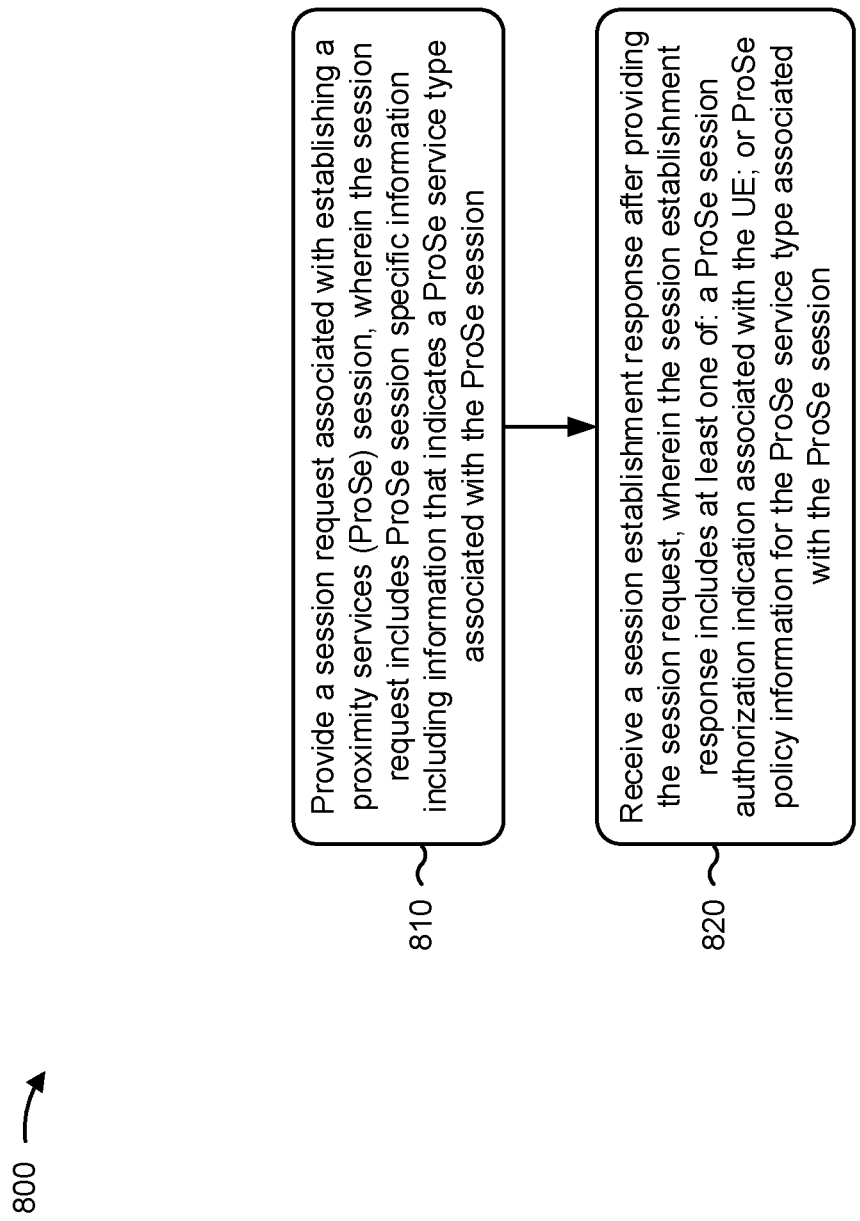
FIGS. 8-10 are diagrams illustrating example processes associated with ProSe session authorization and provisioning support over a 5GS, in accordance with various aspects of the present disclosure.

FIG. 8 is a diagram illustrating an example process 800 performed, for example, by a UE, in accordance with various aspects of the present disclosure. Example process 800 is an example where the UE (e.g., UE 120 and/or the like) performs operations associated with ProSe session authorization and provisioning support over a 5G system.

As shown in FIG. 8, in some aspects, process 800 may include providing a session request associated with establishing a ProSe session, wherein the session request includes ProSe session specific information including information that indicates a ProSe service type associated with the ProSe session (block 810). For example, the UE (e.g., using transmit processor 264, controller/processor 280, memory 282, and/or the like) may provide a session request associated with establishing a ProSe session, as described above. In some aspects, the session request includes ProSe session specific information including information that indicates a ProSe service type associated with the ProSe session.

As further shown in FIG. 8, in some aspects, process 800 may include receiving a session establishment response after providing the session request, wherein the session establishment response includes at least one of a ProSe session authorization indication associated with the UE, or ProSe policy information for the ProSe service type associated with the ProSe session (block 820). For example, the UE (e.g., using receive processor 258, controller/processor 280, memory 282, and/or the like) may receive a session establishment response after providing the session request, as described above. In some aspects, the session establishment response includes at least one of a ProSe session authorization indication associated with the UE, or ProSe policy information for the ProSe service type associated with the ProSe session.

Process 800 may include additional aspects, such as any single aspect or any combination of aspects described below and/or in connection with one or more other processes described elsewhere herein.

In a first aspect, the session request is provided to an access and mobility management device.

In a second aspect, alone or in combination with the first aspect, the ProSe session specific information includes PS-NSSAI.

In a third aspect, alone or in combination with one or more of the first and second aspects, the session request is a ProSe session establishment request.

In a fourth aspect, alone or in combination with one or more of the first through third aspects, the ProSe session establishment request is provided in an NAS transport container for ProSe.

In a fifth aspect, alone or in combination with one or more of the first through fourth aspects, the session establishment response is a ProSe session establishment accept message.

In a sixth aspect, alone or in combination with one or more of the first through fifth aspects, the session establishment response is received from a device configured with a PSMF.

In a seventh aspect, alone or in combination with one or more of the first through sixth aspects, the session request is a PDU session establishment request.

In an eighth aspect, alone or in combination with one or more of the first through seventh aspects, a PDU session type indicated by the PDU session establishment request is set to ProSe.

In a ninth aspect, alone or in combination with one or more of the first through eighth aspects, the session establishment response is a PDU session establishment accept message.

In a tenth aspect, alone or in combination with one or more of the first through ninth aspects, the session establishment response is received from a device configured with an SMF.

In an eleventh aspect, alone or in combination with one or more of the first through tenth aspects, the ProSe session authorization indication indicates whether the UE is authorized for the ProSe service type associated with the ProSe session.

In a twelfth aspect, alone or in combination with one or more of the first through eleventh aspects, the ProSe service type is at least one of a public safety service type; a commercial service type; a gaming service type; an interactive service type; an IIOT service type; or a wearable device service type.

In a thirteenth aspect, alone or in combination with one or more of the first through twelfth aspects, the ProSe policy information includes at least one of authorization policy information associated with the ProSe service type; discovery policy information associated with the ProSe service type; communication policy information associated with the ProSe service type; out-of-coverage operation information associated with one or more types of communication operation; or QoS policy information associated with one or more types of communication operation.

In a fourteenth aspect, alone or in combination with one or more of the first through thirteenth aspects, the communication policy information includes at least one of unicast communication policy information; broadcast communication policy information; groupcast communication policy information; or relay communication policy information.

In a fifteenth aspect, alone or in combination with one or more of the first through fourteenth aspects, the session establishment response includes information associated with a validity timer for the ProSe session.

In a sixteenth aspect, alone or in combination with one or more of the first through fifteenth aspects, process 800 includes receiving a session modification command after receiving the session establishment response, wherein the session modification command includes at least one of: an updated ProSe session authorization indication associated with the UE; or an updated ProSe policy information for the ProSe service type associated with the ProSe session.

In a seventeenth aspect, alone or in combination with one or more of the first through sixteenth aspects, the session modification command is a ProSe session modification command.

In an eighteenth aspect, alone or in combination with one or more of the first through seventeenth aspects, the session modification command is a PDU session modification command.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
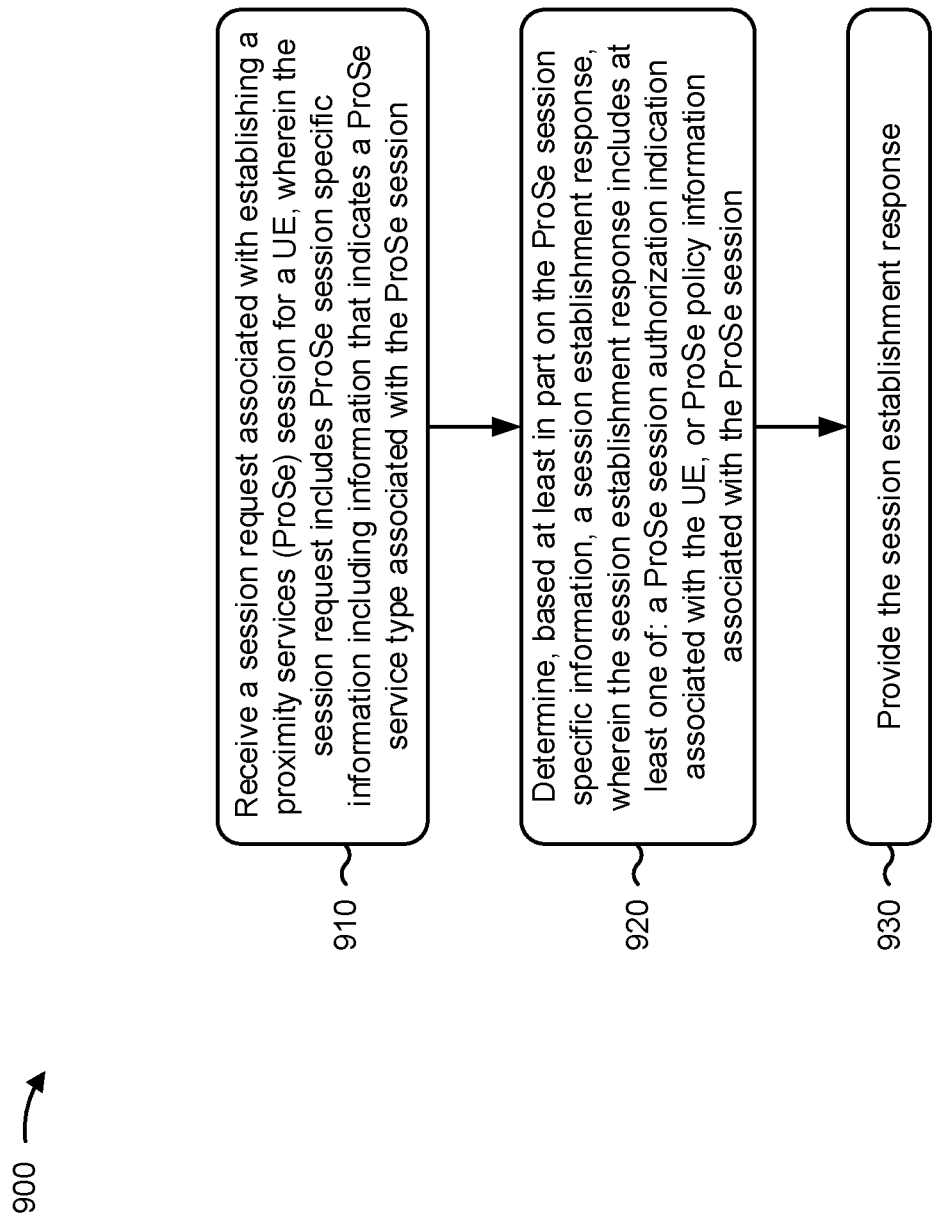

FIG. 9 is a diagram illustrating an example process 900 performed, for example, by a network device, in accordance with various aspects of the present disclosure. Example process 900 is an example where the network device (e.g., network device 130 configured with the PSMF, network device 130 configured with an enhanced SMF, and/or the like) performs operations associated with ProSe session authorization and provisioning support over a 5G system.

As shown in FIG. 9, in some aspects, process 900 may include receiving a session request associated with establishing a ProSe session for a UE, wherein the session request includes ProSe session specific information including information that indicates a ProSe service type associated with the ProSe session (block 910). For example, the network device (e.g., using bus 310, processor 320, memory 330, storage component 340, input component 350, output component 360, communication interface 370, and/or the like) may receive a session request associated with establishing a ProSe session for a UE (e.g., UE 120), as described above. In some aspects, the session request includes ProSe session specific information including information that indicates a ProSe service type associated with the ProSe session.

As further shown in FIG. 9, in some aspects, process 900 may include determining, based at least in part on the ProSe session specific information, a session establishment response, wherein the session establishment response includes at least one of a ProSe session authorization indication associated with the UE, or ProSe policy information associated with the ProSe session (block 920). For example, the network device (e.g., using bus 310, processor 320, memory 330, storage component 340, input component 350, output component 360, communication interface 370, and/or the like) may determine, based at least in part on the ProSe session specific information, a session establishment response, as described above. In some aspects, the session establishment response includes at least one of a ProSe session authorization indication associated with the UE or ProSe policy information associated with the ProSe session.

As further shown in FIG. 9, in some aspects, process 900 may include providing the session establishment response (block 930). For example, the network device (e.g., using bus 310, processor 320, memory 330, storage component 340, input component 350, output component 360, communication interface 370, and/or the like) may provide the session establishment response, as described above.

Process 900 may include additional aspects, such as any single aspect or any combination of aspects described below and/or in connection with one or more other processes described elsewhere herein.

In a first aspect, the session request is received from an access and mobility management device.

In a second aspect, alone or in combination with the first aspect, the ProSe session specific information includes PS-NSSAI.

In a third aspect, alone or in combination with one or more of the first and second aspects, the session request is a ProSe session establishment request.

In a fourth aspect, alone or in combination with one or more of the first through third aspects, the ProSe session establishment request is received in an NAS transport container for ProSe.

In a fifth aspect, alone or in combination with one or more of the first through fourth aspects, the session establishment response is a ProSe session establishment accept message.

In a sixth aspect, alone or in combination with one or more of the first through fifth aspects, the network device is a device configured with a PSMF.

In a seventh aspect, alone or in combination with one or more of the first through sixth aspects, the session request is a PDU session establishment request.

In an eighth aspect, alone or in combination with one or more of the first through seventh aspects, a PDU session type indicated by the PDU session establishment request is set to ProSe.

In a ninth aspect, alone or in combination with one or more of the first through eighth aspects, the session establishment response is a PDU session establishment accept message.

In a tenth aspect, alone or in combination with one or more of the first through ninth aspects, the network device is a device configured with an SMF.

In an eleventh aspect, alone or in combination with one or more of the first through tenth aspects, the ProSe session authorization indication indicates whether the UE is authorized for the ProSe service type associated with the ProSe session.

In a twelfth aspect, alone or in combination with one or more of the first through eleventh aspects, the ProSe service type is at least one of a public safety service type; a commercial service type; a gaming service type; an interactive service type; an IIOT service type; or a wearable device service type.

In a thirteenth aspect, alone or in combination with one or more of the first through twelfth aspects, the ProSe policy information includes at least one of authorization policy information associated with the ProSe service type; discovery policy information associated with the ProSe service type; communication policy information associated with the ProSe service type; out-of-coverage operation information associated with one or more types of communication operation; or QoS policy information associated with one or more types of communication operation.

In a fourteenth aspect, alone or in combination with one or more of the first through thirteenth aspects, the communication policy information includes at least one of unicast communication policy information; broadcast communication policy information; groupcast communication policy information; or relay communication policy information.

In a fifteenth aspect, alone or in combination with one or more of the first through fourteenth aspects, the session establishment response includes information associated with a validity timer for the ProSe session.

In a sixteenth aspect, alone or in combination with one or more of the first through fifteenth aspects, process 900 includes providing a session modification command after receiving the session establishment response, wherein the session modification command includes at least one of: an updated ProSe session authorization indication associated with the UE, or an updated ProSe policy information for the ProSe service type associated with the ProSe session.

In a seventeenth aspect, alone or in combination with one or more of the first through sixteenth aspects, the session modification command is a ProSe session modification command.

In an eighteenth aspect, alone or in combination with one or more of the first through seventeenth aspects, the session modification command is a PDU session modification command.

In a nineteenth aspect, alone or in combination with one or more of the first through eighteenth aspects, process 900 includes obtaining subscription information associated with the UE; and determining whether the UE is authorized for ProSe sessions based at least in part on the subscription information.

In a twentieth aspect, alone or in combination with one or more of the first through nineteenth aspects, the subscription information is obtained from a unified data management device.

In a twenty-first aspect, alone or in combination with one or more of the first through twentieth aspects, process 900 includes registering with the unified data management device to receive updates to the subscription information associated with the UE.

In a twenty-second aspect, alone or in combination with one or more of the first through twenty-first aspects, process 900 includes selecting a policy control device associated with determining the ProSe session authorization indication or the ProSe policy information; and obtaining the ProSe session authorization indication or the ProSe policy information from the policy control device.

In a twenty-third aspect, alone or in combination with one or more of the first through twenty-second aspects, process 900 includes registering with the policy control device to receive updates to the ProSe session authorization indication or updates to the ProSe policy information.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
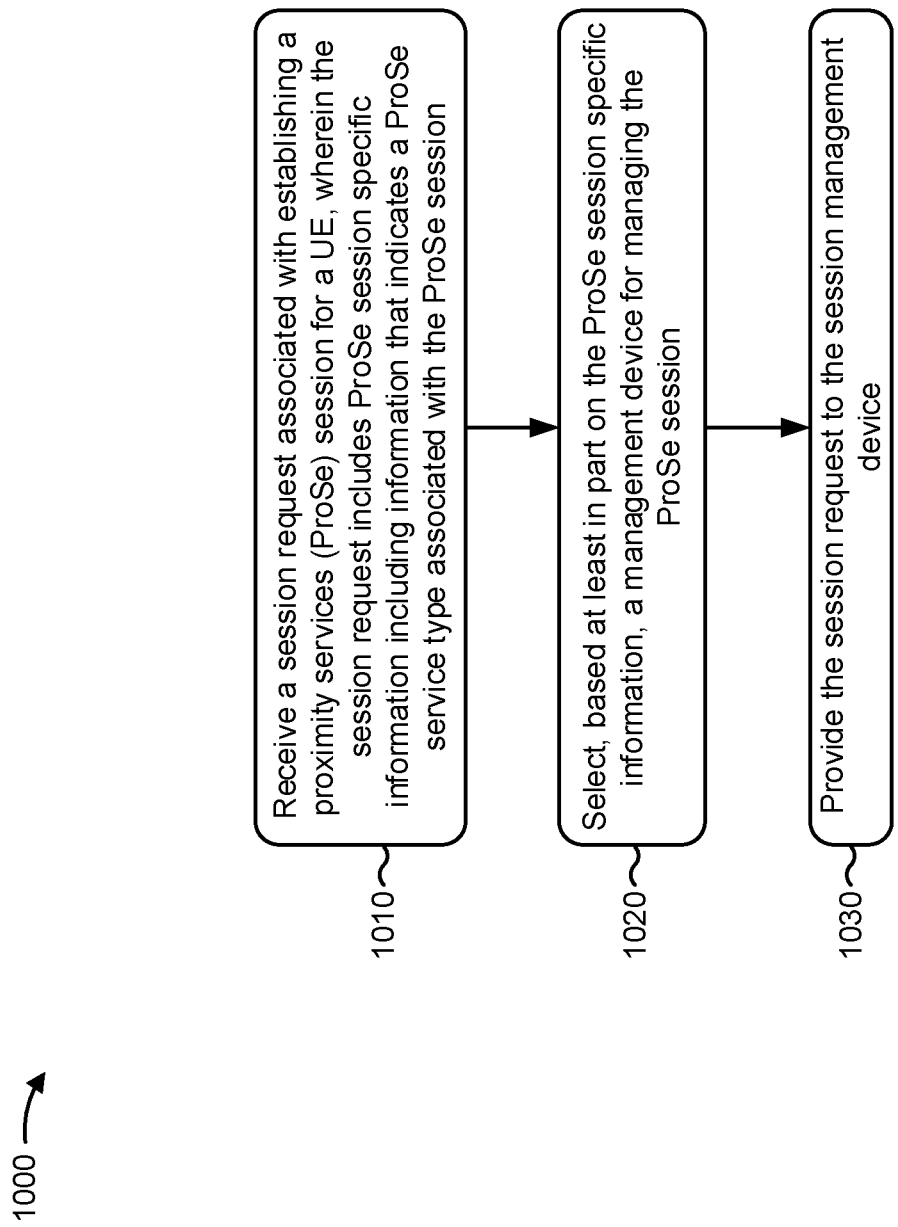

FIG. 10 is a diagram illustrating an example process 1000 performed, for example, by a network device, in accordance with various aspects of the present disclosure. Example process 1000 is an example where the network device (e.g., network device 130 configured with the AMF and/or the like) performs operations associated with ProSe session authorization and provisioning support over a 5G system.

As shown in FIG. 10, in some aspects, process 1000 may include receiving a session request associated with establishing a ProSe session for a UE, wherein the session request includes ProSe session specific information including information that indicates a ProSe service type associated with the ProSe session (block 1010). For example, the network device (e.g., using bus 310, processor 320, memory 330, storage component 340, input component 350, output component 360, communication interface 370, and/or the like) may receive a session request associated with establishing a ProSe session for a UE (e.g., UE 120), as described above.

In some aspects, the session request includes ProSe session specific information including information that indicates a ProSe service type associated with the ProSe session.

As further shown in FIG. 10, in some aspects, process 1000 may include selecting, based at least in part on the ProSe session specific information, a session management device for managing the ProSe session (block 1020). For example, the network device (e.g., using bus 310, processor 320, memory 330, storage component 340, input component 350, output component 360, communication interface 370, and/or the like) may select, based at least in part on the ProSe session specific information, a session management device for managing the ProSe session, as described above.

As further shown in FIG. 10, in some aspects, process 1000 may include providing the session request to the session management device (block 1030). For example, the network device (e.g., using bus 310, processor 320, memory 330, storage component 340, input component 350, output component 360, communication interface 370, and/or the like) may provide the session request to the session management device, as described above.

Process 1000 may include additional aspects, such as any single aspect or any combination of aspects described below and/or in connection with one or more other processes described elsewhere herein.

In a first aspect, the session request is received from the UE.

In a second aspect, alone or in combination with the first aspect, the ProSe session specific information includes PS-NSSAI.

In a third aspect, alone or in combination with one or more of the first and second aspects, the session request is a ProSe session establishment request.

In a fourth aspect, alone or in combination with one or more of the first through third aspects, the ProSe session establishment request is provided in an NAS transport container for ProSe.

In a fifth aspect, alone or in combination with one or more of the first through fourth aspects, the session request is a PDU session establishment request.

In a sixth aspect, alone or in combination with one or more of the first through fifth aspects, a PDU session type indicated by the PDU session establishment request is set to ProSe.

In a seventh aspect, alone or in combination with one or more of the first through sixth aspects, the network device is a network device configured with a PSMF.

In an eighth aspect, alone or in combination with one or more of the first through seventh aspects, the network device is a network device configured with an SMF.

In a ninth aspect, alone or in combination with one or more of the first through eighth aspects, the ProSe service type is at least one of a public safety service type; a commercial service type; a gaming service type; an interactive service type; an IIOT service type; or a wearable device service type.

In a tenth aspect, alone or in combination with one or more of the first through ninth aspects, process 1000 includes creating a ProSe session context based at least in part on receiving the session request.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   providing a session request associated with establishing a proximity services (ProSe) session,
      wherein the session request includes ProSe session specific information including information that indicates a ProSe service type associated with the ProSe session;
   receiving a session establishment response after providing the session request,
      wherein the session establishment response includes at least one of:
         a ProSe session authorization indication associated with the UE, or
         ProSe policy information for the ProSe service type associated with the ProSe session, and
   receiving a session modification command after receiving the session establishment response,
      wherein the session modification command includes at least one of:
         an updated ProSe session authorization indication associated with the UE; or
         updated ProSe policy information for the ProSe service type associated with the ProSe session.

2. The method of claim 1, wherein the session request is provided to an access and mobility management device.

3. The method of claim 1, wherein the ProSe session specific information includes ProSe network slice selection assistance information (PS-NSSAI).

4. The method of claim 1, wherein the session request is a ProSe session establishment request.

5. The method of claim 4, wherein the ProSe session establishment request is provided in a non-access stratum (NAS) transport container for ProSe.

6. The method of claim 1, wherein the session establishment response is a ProSe session establishment accept message.

7. The method of claim 1, wherein the session establishment response is received from a device configured with a ProSe management function (PSMF).

8. The method of claim 1, wherein the session request is a protocol data unit (PDU) session establishment request.

9. The method of claim 8, wherein a PDU session type indicated by the PDU session establishment request is set to ProSe.

10. The method of claim 1, wherein the session establishment response is a protocol data unit (PDU) session establishment accept message.

11. The method of claim 1, wherein the session establishment response is received from a device configured with a session management function (SMF).

12. The method of claim 1, wherein the ProSe session authorization indication indicates whether the UE is authorized for the ProSe service type associated with the ProSe session.

13. The method of claim 1, wherein the ProSe service type is at least one of:
   a public safety service type;
   a commercial service type;
   a gaming service type;
   an interactive service type;
   an industrial Internet of things (IIOT) service type; or
   a wearable device service type.

14. The method of claim 1, wherein the ProSe policy information includes at least one of:
   authorization policy information associated with the ProSe service type;
   discovery policy information associated with the ProSe service type;
   communication policy information associated with the ProSe service type;
   out-of-coverage operation information associated with one or more types of communication operation; or
   quality of service (QoS) policy information associated with one or more types of communication operation.

15. The method of claim 14, wherein the communication policy information includes at least one of:
  unicast communication policy information;
  broadcast communication policy information;
  groupcast communication policy information; or
  relay communication policy information.

16. The method of claim 1, wherein the session establishment response includes information associated with a validity timer for the ProSe session.

17. The method of claim 1, wherein the session modification command is a ProSe session modification command.

18. The method of claim 1, wherein the session modification command is a protocol data unit (PDU) session modification command.

19. A method of wireless communication performed by a network device, comprising:
  receiving a session request associated with establishing a proximity services (ProSe) session for a user equipment (UE), wherein the session request includes ProSe session specific information including information that indicates a ProSe service type associated with the ProSe session;
  determining, based at least in part on the ProSe session specific information, a session establishment response, wherein the session establishment response includes at least one of: a ProSe session authorization indication associated with the UE, or ProSe policy information associated with the ProSe session; providing the session establishment response; and providing a session modification command after providing the session establishment response, wherein the session modification command includes at least one of: an updated ProSe session authorization indication associated with the UE: or updated ProSe policy information for the ProSe service type associated with the ProSe session.

20. The method of claim 19, wherein the network device is a device configured with a ProSe management function (PSMF).

21. The method of claim 19, wherein the session request is a protocol data unit (PDU) session establishment request.

22. The method of claim 19, wherein the session establishment response is a protocol data unit (PDU) session establishment accept message.

23. The method of claim 19, wherein the network device is a device configured with a session management function (SMF).

24. The method of claim 19, further comprising:
  obtaining subscription information associated with the UE; and
  determining whether the UE is authorized for ProSe sessions based at least in part on the subscription information.

25. The method of claim 19, further comprising:
  selecting a policy control device associated with determining the ProSe session authorization indication or the ProSe policy information; and
  obtaining the ProSe session authorization indication or the ProSe policy information from the policy control device.

26. A method of wireless communication performed by a network device, comprising:
  receiving a session request associated with establishing a proximity services (ProSe) session for a user equipment (UE), wherein the session request includes ProSe session specific information including information that indicates a ProSe service type associated with the ProSe session;
  selecting, based at least in part on the ProSe session specific information, a session management device for managing the ProSe session; providing the session request to the session management device; providing the session request to the session management device; and providing a session modification command providing the session establishment response, wherein the session modification command includes at least one of:
  an updated ProSe session authorization indication associated with the UE; or updated ProSe policy information for the ProSe service type associated with the ProSe session.

27. The method of claim 26, further comprising:
  creating a ProSe session context based at least in part on receiving the session request.

28. A user equipment (UE) for wireless communication, comprising:
  a memory; and
  one or more processors coupled to the memory, the one or more processors configured to:
    provide a session request associated with establishing a proximity services (ProSe) session,
      wherein the session request includes ProSe session specific information including information that indicates a ProSe service type associated with the ProSe session;
    receive a session establishment response after providing the session request,
      wherein the session establishment response includes at least one of:
        a ProSe session authorization indication associated with the UE, or
        ProSe policy information for the ProSe service type associated with the ProSe session; and
    receive a session modification command after receiving the session establishment response,
      wherein the session modification command includes at least one of:
        an updated ProSe session authorization indication associated with the UE; or
        updated ProSe policy information for the ProSe service type associated with the ProSe session.

29. The UE of claim 28, wherein the ProSe service type is at least one of:
  a gaming service type;
  an interactive service type;
  an industrial Internet of things (IIOT) service type; or
  a wearable device service type.

30. The UE of claim 28, wherein the session establishment response includes information associated with a validity timer for the ProSe session.

* * * * *